United States Patent Office.

GILES B. WILLIAMS, OF NEW YORK, N. Y., ASSIGNOR TO ELISHA M. ALLEN, OF SAME PLACE.

Letters Patent No. 84,241, dated November 17, 1868.

IMPROVEMENT IN DESICCATED COCOANUT.

The Schedule referred to in these Letters Patent and making part of the same.

*To all whom it may concern:*

Be it known that I, GILES B. WILLIAMS, of the city, county, and State of New York, have invented a new and improved Desiccated Cocoanut; and that the following description, taken in connection with the accompanying drawings hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

This invention relates to a new and useful improvement in preparing cocoanuts for pies, puddings, cakes, &c.

The meat of the cocoanut has been grated and dried, or the moisture expelled by heat, and sugar added, so that it will keep well if preserved from moisture; but it has been found that, if not put in a perfectly dry place, it will soon turn acid in a greater or less degree, and its value, as a confection, greatly deteriorated.

It is almost impossible, under the ordinary treatment or mode of preparing the cocoanut-meat, for families to preserve it properly, as it is put up in paper packages, and even the condensed steam and moisture in the air of an ordinary kitchen will cause it to "change," or turn sour.

My improvement is designed to obviate this difficulty, and, to this end, I add an alkali to the grated cocoanut, which effectually prevents acidification without impairing or affecting in the least the flavor of the cocoanut-meat.

I take the cocoanut-meat from the shell by any proper means, and rasp or grate the meat, so as to reduce it to a proper degree of fineness. I then mix five (5) pounds of the bicarbonate of soda with a barrel of finely-pulverized white sugar. This mixture of soda and sugar is put into four hundred and fifty (450) pounds of the grated cocoanut-meat, which is desiccated or dried in an oven, or by heat in any suitable apparatus.

In practice I generally add at first, or previous to desiccation, about two-thirds of the sugar-and-soda mixture, and, after desiccation, add the remaining third of the mixture. I do not, however, confine myself to any particular period in the process for adding the sugar and soda.

The bicarbonate of soda effectually prevents acidification, and overcomes the great objection urged by consumers against the prepared cocoanut now on general sale, and which would soon come into general use were it not for the difficulty above alluded to.

I do not claim the article of desiccated cocoanut, as that has been described in the patent of Maltby and Smith, June 25, 1867.

Having thus described my invention,

What I claim as new, and desire to secure by Letters Patent, is—

An improved article of confection, consisting of desiccated cocoanut-meat combined with sugar and the bicarbonate of soda, substantially as set forth.

The above specification of my invention signed by me, this 19th day of October, 1868.

GILES B. WILLIAMS.

Witnesses:
  A. R. HAIGHT,
  H. L. WATTENBERG.